US009260673B2

(12) United States Patent
Goller

(10) Patent No.: US 9,260,673 B2
(45) Date of Patent: Feb. 16, 2016

(54) METHOD FOR OPERATING A GASIFIER

(71) Applicant: General Electric Company, Schenectady, NY (US)

(72) Inventor: George Albert Goller, Greenville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 172 days.

(21) Appl. No.: 14/187,694

(22) Filed: Feb. 24, 2014

(65) Prior Publication Data

US 2014/0157668 A1   Jun. 12, 2014

Related U.S. Application Data

(63) Continuation-in-part of application No. 12/890,916, filed on Sep. 27, 2010, now abandoned, and a continuation-in-part of application No. 12/890,935, filed on Sep. 27, 2010, now abandoned.

(51) Int. Cl.
C10J 3/74 (2006.01)
C10J 3/72 (2006.01)
C10J 3/48 (2006.01)

(52) U.S. Cl.
CPC *C10J 3/723* (2013.01); *C10J 3/485* (2013.01); *C10J 3/74* (2013.01); *C10J 2300/0959* (2013.01); *C10J 2300/1269* (2013.01); *C10J 2300/1276* (2013.01); *C10J 2300/1653* (2013.01); *C10J 2300/1846* (2013.01); *Y02E 20/18* (2013.01)

(58) Field of Classification Search
CPC .............. C10J 3/485; C10J 3/74; C10J 3/723; C10J 2300/0959
USPC .............................................................. 48/61
See application file for complete search history.

(56) References Cited

U.S. PATENT DOCUMENTS

| 4,692,306 A | 9/1987 | Minet et al. |
| 5,755,838 A | 5/1998 | Tanaka et al. |
| 2003/0167692 A1 | 9/2003 | Jewell et al. |
| 2007/0181854 A1 | 8/2007 | Briesch et al. |
| 2007/0186473 A1 | 8/2007 | Wallace |
| 2007/0193249 A1 | 8/2007 | Takashima et al. |
| 2007/0196267 A1 | 8/2007 | Carpenter et al. |
| 2007/0256422 A1 | 11/2007 | Wakefield et al. |
| 2008/0166278 A1 | 7/2008 | Goller et al. |
| 2008/0175770 A1 | 7/2008 | Wallace |

Primary Examiner — Matthew Merkling
(74) Attorney, Agent, or Firm — Dority & Manning, PA

(57) ABSTRACT

A method for operating a gasifier includes detecting a corrosive compound between a combustion chamber defined within the gasifier and an inner wall of a pressure vessel that at least partially surrounds the combustion chamber via a corrosion sensor and increasing the temperature of the inner wall of the pressure vessel to a temperature that is greater than a dew point of the corrosive compound via a heater that at least partially surrounds the pressure vessel. The method may also include adjusting a flow of at least one of a fuel, an oxidant and a diluent to the gasifier in response to the detection of the corrosive compound so as to modify the dew point of the corrosive compound.

19 Claims, 3 Drawing Sheets

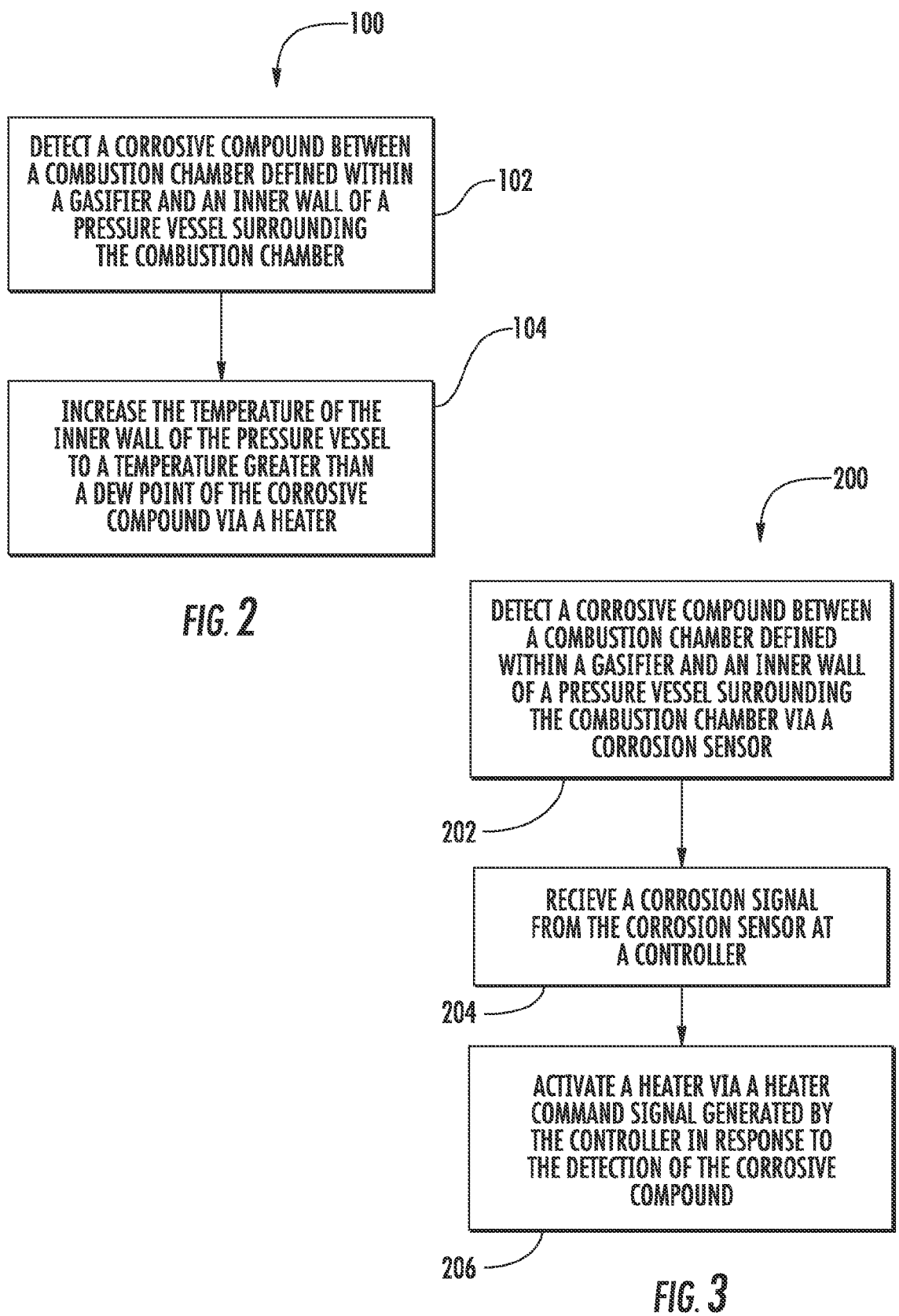

METHOD FOR OPERATING A GASIFIER

CROSS REFERENCE TO RELATED APPLICATIONS

The present application claims priority as a continuation in part of U.S. application Ser. No. 12/890,916 having a filing date of Sep. 27, 2010 and United U.S. application Ser. No. 12/890,935 having a filing date of Sep. 27, 2010, both of which are incorporated herein by reference in their entirety.

FIELD OF THE INVENTION

The present invention generally involves a method for operating a gasifier. Specific embodiments of the present invention may include a method for operating a gasifier that includes adjusting conditions within or surrounding the gasifier based on detection of corrosive compound formation or deposits within the gasifier during operation.

BACKGROUND OF THE INVENTION

An Integrated Gasification Combined Cycle (IGCC) is known in the art for converting petroleum coke or coal into synthetic gas which may then be supplied to a gas turbine to generate power. The synthetic gas, a clean burning fuel, may be burned directly in the gas turbine or may be processed further to produce methanol and hydrogen for combustion in the gas turbine.

The IGCC typically includes a gasifier to convert the petroleum coke or coal into the synthetic gas. The petroleum coke or coke is partially combusted with oxygen in a gasifier at a high temperature and pressure to produce the synthetic gas. The gasifier may be constructed of an insulated brick lining surrounded by a pressure resistant steel vessel. The brick lining is typically designed to withstand internal gasifier temperatures of approximately 2,500-3,000° F., while the steel vessel is typically designed to withstand an inner surface temperature of approximately 400-600° F.

The gasification process may produce highly corrosive byproducts, such as ammonium chloride. If the dew point of the inner surface of the steel vessel is less than the dew point of the corrosive byproducts, then the corrosive byproducts may condense on an inside surface of the steel vessel, causing aqueous corrosion on the inside surface of the steel vessel. The aqueous corrosion on the inside surface of the steel vessel is undesirable in that it may result in unplanned outages for maintenance and/or repair and ultimately reduces the useful life of the steel vessel.

Various attempts have been made to control the production and/or effects of the corrosive byproducts. For example, attempts have been made to indirectly monitor the production of the synthetic gas, and thus the production of the corrosive byproducts. Other attempts have involved costly external wind deflectors and variations in the design of the brick insulation. However, an improved method for controlling the gasifier would be useful in reducing corrosion caused by the corrosive byproducts.

BRIEF DESCRIPTION OF THE INVENTION

Aspects and advantages of the invention are set forth below in the following description, or may be obvious from the description, or may be learned through practice of the invention.

One embodiment of the present invention is a method for operating a gasifier. The method includes detecting a corrosive compound between a combustion chamber defined within the gasifier and an inner wall of a pressure vessel that at least partially surrounds the combustion chamber via a corrosion sensor. The method further includes increasing the temperature of the inner wall of the pressure vessel to a temperature that is greater than a dew point of the corrosive compound via a heater that at least partially surrounds the pressure vessel.

Another embodiment of the present invention is a method for operating a gasifier. The method includes detecting a corrosive compound between a combustion chamber defined within the gasifier and an inner wall of a pressure vessel surrounding the combustion chamber via a corrosion sensor where the corrosion sensor generate a corrosion signal that is indicative of the presence of the corrosive compound. The method also includes receiving the corrosion signal at a controller, and activating a heater that at least partially surrounds the pressure vessel via a heater command signal generated by the controller in response to the detection of the corrosive compound so as to increase the inner wall temperature of the pressure vessel to a temperature that is above a dew point of the corrosive compound.

The present invention also includes a method for operating a gasifier. The method includes detecting a corrosive compound between a combustion chamber defined within the gasifier and an inner wall of a pressure vessel that surrounds the combustion chamber via a corrosion sensor. The method further includes adjusting the pressure inside the pressure vessel in response to the detection of the corrosive compound. The pressure is adjusted such that a dew point of the corrosive compound detected is less than the temperature of the inner wall of the pressure vessel.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 2 is a flow diagram of a first exemplary method for operating a gasifier as shown in FIG. 1, according to one embodiment of the present invention;

FIG. 3 is a flow diagram of a second exemplary method for operating a gasifier as shown in FIG. 1, according to one embodiment of the present invention;

DETAILED DESCRIPTION OF THE INVENTION

Figure 1:
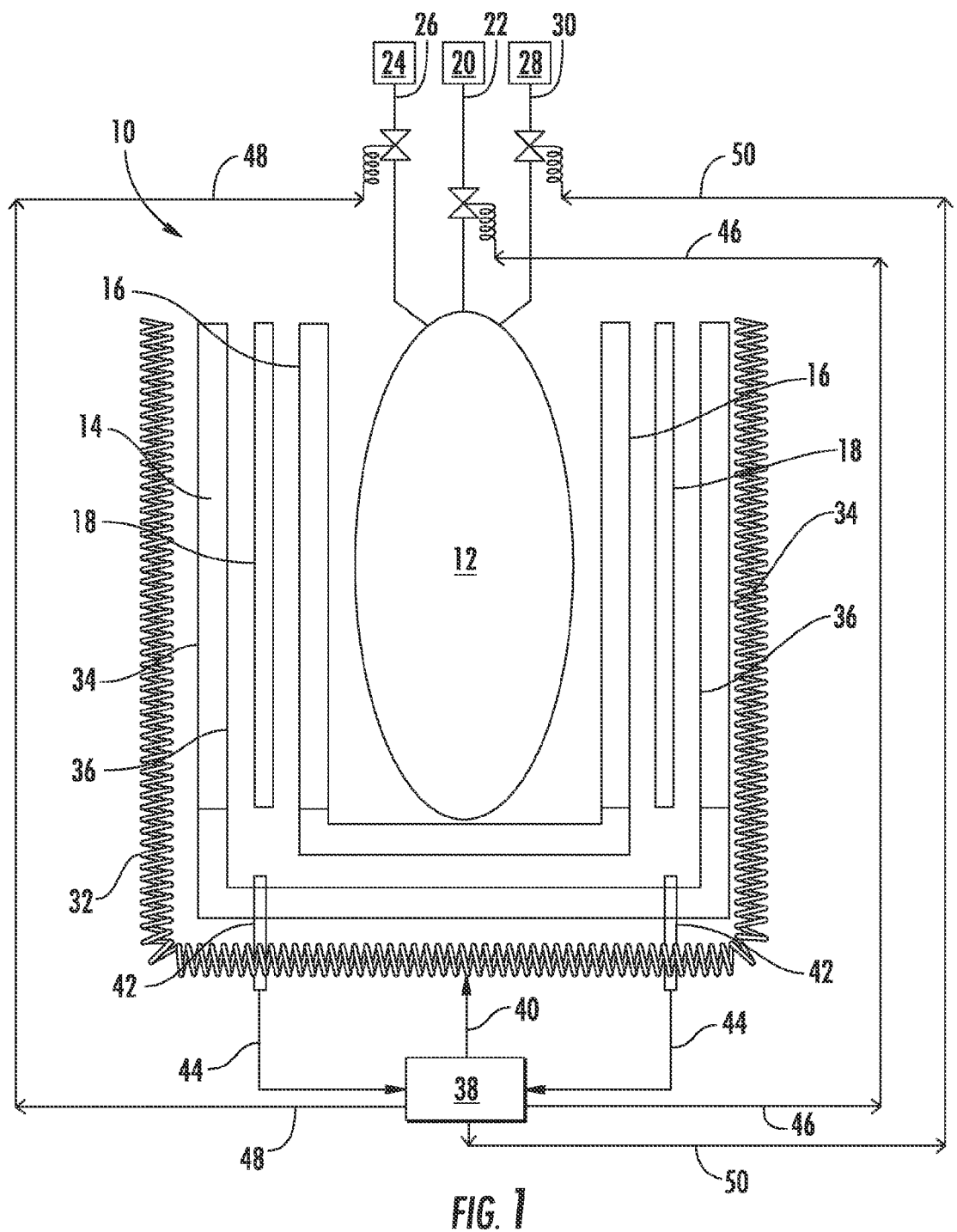
FIG. 1 is a simplified cross-section of an exemplary gasifier as may be incorporated in one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 is a simplified cross-section of an exemplary gasifier 10 as may be incorporated or utilized in various embodiments of the present invention. As a general proposition, the gasifier 10 includes a combustion chamber 12 surrounded by a pressure vessel 14. The combustion chamber 12 provides an enclosed volume for combustion of fuel and oxygen to produce a synthetic gas. As such, the combustion chamber 12 is constructed from material capable of withstanding the maximum temperature of the combustion. For example, the combustion chamber 12 may include a refractory insulated brick lining 16 capable of continuous exposure to temperatures of approximately 2,500-3,000° F. The pressure vessel 14 is generally constructed from steel or a steel alloy capable of containing the pressure generated by the combustion and withstanding a continuous exposure to temperatures of approximately 400-600° F. The gasifier 10 may include additional surrounding or partially surrounding layers of material that insulate, contain, or otherwise enclose the gasifier. For example, as shown in FIG. 1, a refractory grout 18 coating between the combustion chamber 12 and the pressure vessel 14 may be used to attenuate heat between the combustion chamber 12 and the pressure vessel 14.

The gasifier 10 may further include at least one of a fuel supply 20 for supplying a fuel 22, an oxidant supply 24 for supplying an oxidant 26 and a diluent supply 28 for supplying a diluent 30 to the combustion chamber 12. The fuel 22 generally comprises petroleum coke, coal, or another suitable product to be gasified. The oxidants 26 generally comprise oxygen, an oxygen compound, or another chemical capable of combusting with the fuel. The diluents 30 generally comprise nitrogen, argon, or another inert gas for diluting the oxidants 26 prior to combustion. The fuel supply 20, oxidant supply 24, and/or diluent supply 28 may comprise any suitable tank, piping, and/or valve system for transporting the corresponding fuel 22, oxidants 26, or diluents 30 to the gasifier 10. The fuel 22, oxidants 26, and/or diluents 30 combine in the combustion chamber 12 to produce the synthetic gas. In addition, under certain operating conditions the combustion of the fuel 22, oxidants 26, and/or diluents 30 produces one or more byproducts which may include corrosive compounds such as ammonium chloride which may settle out as corrosive deposits within in the combustion chamber 12.

In particular embodiments, as shown in FIG. 1, the gasifier 10 includes a heater 32 at least partially surrounding an outer wall 34 of the pressure vessel 14. The heater 32 may comprise any suitable system for supplying heat to the outer wall 34 of the pressure vessel 14 so that the heat penetrates through the pressure vessel 14 to increase the temperature of an inner wall 36 of the pressure vessel 14. For example, the heater 32 may comprise conductive, radiant, or convective heaters such as, for example, resistive coils, infrared heaters, heated coolant, or any suitable system known to one of ordinary skill in the art for providing heat.

The heater 32 may be manually or automatically activated or energized as needed to increase the temperature of the inner wall 36 of the pressure vessel 14. For example, measured parameters of the gasifier 10, composition of the fuel 22, production rate of the synthetic gas, or any other operational parameter may be used to determine when to activate or energize the heater 32. In this manner, the temperature of the inner wall 36 of the pressure vessel 14 may be maintained greater than a dew point of any corrosive compound produced during combustion to reduce and/or prevent condensation of the corrosive compound on the inner wall 36 of the pressure vessel 14.

In one embodiment, a controller 38 or computing device is in electronic communication with at least one of the heater 32, the fuel supply 20, the oxidant supply 24 and the diluent supply 28. The controller 38 may be a stand alone component or a sub-component included in any computing system known in the art, such as a laptop, a personal computer, a mini computer, a mainframe computer, or industrial controllers, microcontrollers, or embedded systems. The various controller and computer devices or systems discussed herein are not limited to any particular hardware architecture or configuration. Embodiments of the systems and methods set forth herein may be implemented by one or more general-purpose or customized controllers adapted in any suitable manner to provide the desired functionality. The controller 38 may be adapted to provide additional functionality, either complementary or unrelated to the present subject matter. For instance, one or more controllers may be adapted to provide the described functionality by accessing software instructions rendered in a computer-readable form.

When software is used, any suitable programming, scripting, or other type of language or combinations of languages may be used to implement the teachings contained herein. However, software need not be used exclusively, or at all. For example, as will be understood by those of ordinary skill in the art without required additional detailed discussion, some systems and methods set the forth and disclosed herein may also be implemented by hard-wired logic or other circuitry, including, but not limited to, application-specific circuits. Of course, various combinations of computer-executed software and hard-wired logic or other circuitry may be suitable as well. As described herein, at least one technical effect of the controller 38 is to control the temperature of the inner wall 36 of the pressure vessel 14 and/or pressure inside the combustion chamber 12 and/or pressure vessel 14.

In one embodiment, the controller 38 may send a heater signal 40 to the heater 32 to activate or energize the heater 32. For example, the controller 38 may be programmed to activate or energize the heater 32 at timed intervals, based on measured parameters of the gasifier 10, chemical composition of the fuel 22, production rate of the synthetic gas, or any other operational parameter.

In particular embodiments, as shown in FIG. 1, the gasifier 10 may further include at least one corrosion sensor or probe 42 disposed between the pressure vessel 14 and the combustion chamber 12. The corrosion sensor 42 may comprise an electronic circuit that measures a voltage potential or current flow created by the presence of the corrosive compounds on the inner wall 36 of the pressure vessel 14. The corrosion sensor 42 may thus generate a corrosion signal 44 that is reflective of the presence and/or amount of corrosive compounds present between the pressure vessel 14 and the combustion chamber 12. For example, the corrosion signal 44 may be reflective of the presence and/or amount of corrosive compounds present between the refractory insulated brick lining 16 and the inner wall 36 and/or between the refractory grout 18 and the inner wall 36. The corrosion signal 44 may be manually interpreted and acted on by an operator to activate or energize the heater 32, as desired. Alternately, the corrosion sensor 42 may be connected to the controller 38. In this manner, the corrosion sensor 42 may transmit the corrosion signal 44 to the controller 38. The controller 38 may be programmed to activate or energize the heater 32 upon receiving a predetermined corrosion signal 44 that is indicative of a predefined maximum or acceptable corrosion compound limit value for a particular corrosive compound.

In various embodiments, as shown in FIG. 1, the controller 38 may be programmed to execute one or more commands, programs or algorithms to reduce and/or prevent condensation of corrosive compounds between the pressure vessel 14 and the combustion chamber 12 by adjusting the pressure in the combustion chamber 12 and/or pressure vessel 14 in addition or in the alternative to energizing the heater 32. Specifically, the flow rate of the fuel 22, oxidants 26, and/or diluents 30 may be adjusted to raise or lower the amount of combustion occurring in the combustion chamber 12, thus producing a corresponding increase or decrease in the pressure in the combustion chamber 12 and/or pressure vessel 14. The increase or decrease in the pressure in the combustion chamber 12 and/or pressure vessel 14 produces a corresponding increase or decrease in the dew point of any corrosive compounds, thus reducing and/or preventing the condensation of any corrosive compounds between the pressure vessel 14 and the combustion chamber 12.

Measured parameters of the gasifier 10, content of the fuel 22, production rate of the synthetic gas, or any other operational parameter may be used to manually adjust the flow rate of the fuel 22, oxidants 26, and/or diluents 30. For example, the gasification of higher energy fuel generally results in a higher pressure in the combustion chamber 12 and pressure vessel 14. This higher pressure in the combustion chamber 12 and pressure vessel 14 produces a corresponding higher dew point for any corrosive compounds produced as byproducts. The higher dew point for the corrosive compounds may lead to undesirable condensation of the corrosive compounds on the relatively cooler inner wall 36 of the pressure vessel 14. Therefore, the flow of fuel and/or oxidants may be decreased to reduce the pressure in the combustion chamber 14 and produce a corresponding decrease in the dew point of any corrosive compounds produced as byproducts. Alternately, or in addition, the flow rate of the diluents may be increased to raise the dilution of the oxidants prior to combustion, producing a similar increase in the pressure and dew point of any corrosion compounds produced as byproducts.

In one embodiment, as shown in FIG. 2, the controller 38 may be programmed to generate a fuel signal 46 to control the flow of fuel 22 to the combustion chamber 12, an oxidant signal 48 to control the flow of oxidants 26 to the combustion chamber 12, and/or a diluent signal 50 to control the flow of diluents 30 to the combustion chamber 12 to adjust the pressure inside the pressure vessel 14 and/or combustion chamber 12. The controller 38 may generate the fuel 46, oxidant 48, and/or diluent 50 signals at timed intervals, based on the measured parameters of the gasifier 10, content of the fuel 22, production rate of the synthetic gas, or any other operational parameter.

Alternately, or in addition, the corrosion sensor 42 may generate the corrosion signal 44 reflective of the presence and/or amount of corrosive compounds present between the pressure vessel 14 and the combustion chamber 12, as previously described. The corrosion signal 44 may be manually interpreted and acted on by an operator to adjust the flow of fuel 22, oxidants 26, and/or diluents 30 to raise or lower the pressure inside the pressure vessel 14 and/or combustion chamber 12, as desired. Alternately, the corrosion sensor 42 may be connected to the controller 38 to transmit the corrosion signal 44 to the controller 38. In this manner, the controller 38 may be programmed to adjust the flow of fuel 22, oxidants 26, and/or diluents 30 upon receiving the predetermined corrosion signal.

One of ordinary skill in the art will readily appreciate that the gasifier 10 shown in FIG. 1 may provide a method for reducing and/or preventing corrosive compounds from condensing between the pressure vessel 14 and the combustion chamber 12. FIG. 2 is a flow diagram of a first exemplary method for operating a gasifier 10 as shown in FIG. 1, herein referred to as "method 100", according to one embodiment of the present invention. At step 102, method 100 includes detecting a corrosive compound between the combustion chamber 12 and the inner wall 36 of the pressure vessel 14 via at least one corrosion sensor 42. At step 104, method 100 includes increasing the temperature of the inner wall 36 of the pressure vessel 14 to a temperature that is greater than a dew point of the corrosive compound via the heater 32. As a result, adverse effects of buildup and/or production of the corrosive compound may be reduced or prevented, thereby enhancing syngas production while reducing wear on the pressure vessel.

In one embodiment method 100 further includes adjusting a flow of at least one of the fuel 22, the oxidant 26 and the diluent 30 to the gasifier 10 in response to the detection of the corrosive compound inside the pressure vessel 14 and/or the combustion chamber 12 to modify the dew point of the corrosive compound. In another embodiment, method 100 includes adjusting the pressure inside the pressure vessel 14 so that the dew point of the corrosive compound is less than the temperature of the inner wall 36 of the pressure vessel 14. In another embodiment, method 100 further includes adjusting a flow of the fuel 22 to the gasifier 10 to adjust the pressure inside the pressure vessel 14, thus modifying the dew point of the corrosive compound. In another embodiment, method 100 includes adjusting a flow of the oxidant 26 to the gasifier 10 to adjust the pressure inside the pressure vessel 14, thus modifying the dew point of the corrosive compound. In another embodiment, method 100 includes adjusting a flow of the diluent 30 to the gasifier 10 to adjust the pressure inside the pressure vessel, thus modifying the dew point of the corrosive compound.

FIG. 3 is a flow diagram of a second exemplary method for operating a gasifier 10 as shown in FIG. 1, herein referred to as "method 200", according to one embodiment of the present invention. At step 202, method 200 includes detecting a corrosive compound between the combustion chamber 12 and the inner wall 36 of the pressure vessel 14 via at least one corrosion sensor 42 where the at least one corrosion sensor 42 generates a corrosion signal 44 that is indicative of the presence of the corrosive compound. At step 204, method 200 includes receiving the corrosion signal 44 at the controller 38 and at step 206 method 200 includes activating the heater 32 via a heater command signal 40 that is generated by the controller 38 in response to the detection of the corrosive compound, thereby increasing the inner wall 36 temperature of the pressure vessel 14 to a temperature that is above a dew point of the corrosive compound. As a result, adverse effects of buildup and/or production of the corrosive compound may be reduced or prevented, thereby enhancing syngas production while reducing wear on the pressure vessel.

In one embodiment, method 200 includes adjusting a flow of at least one of the fuel 22, the oxidant 26, or the diluent 30 to the combustion chamber 12 in response to the detection of the corrosive compound in order to regulate and/or modify the dew point of the corrosive compound. In one embodiment, method 200 includes adjusting the pressure inside the pressure vessel 14 so that the dew point of the corrosive compound detected in the gasifier 10 is less than the temperature of the inner wall 36 of the pressure vessel 36. In another embodiment, method 200 includes generating a fuel signal 46 via the controller 38 to control a flow of the fuel 22 to the combustion chamber 12, thereby adjusting the pressure inside the pressure vessel 14 so that the dew point of the corrosive compound detected in the gasifier 10 is less than the temperature of the inner wall 36 of the pressure vessel 36.

In one embodiment, method 200 includes generating an oxidant signal 48 via the controller 38 to control a flow of oxidant 26 to the combustion chamber 12, thus adjusting the pressure inside the pressure vessel 14 so that the dew point of the corrosive compound detected in the gasifier 10 is less than the temperature of the inner wall 36 of the pressure vessel 36. In one embodiment, method 200 includes generating a diluent signal 50 via the controller 38 to control a flow of the diluent 30 to the combustion chamber 12, thus adjusting the pressure inside the pressure vessel 14 so that the dew point of the corrosive compound detected in the gasifier 10 is less than the temperature of the inner wall 36 of the pressure vessel 36.

Figure 4:
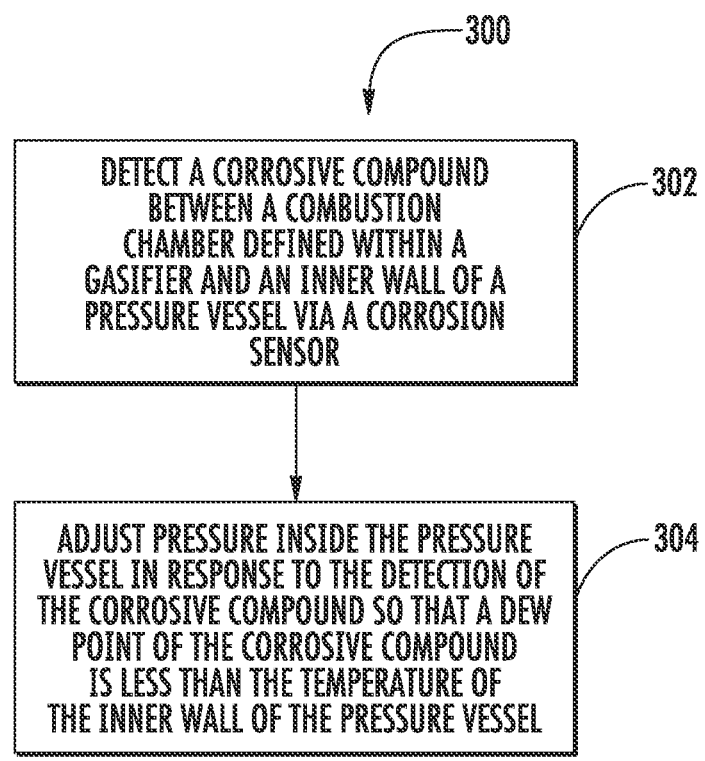
FIG. 4 is a flow diagram of a third exemplary method for operating a gasifier as shown in FIG. 1, according to one embodiment of the present invention.

FIG. 4 is a flow diagram of a third exemplary method for operating a gasifier 10 as shown in FIG. 1, herein referred to as "method 300", according to one embodiment of the present invention. At step 302, method 200 includes detecting a corrosive compound between the combustion chamber 12 and the inner wall 36 of the pressure vessel 14 via at least one corrosion sensor 42. At step 304, method 300 includes adjusting pressure inside the pressure vessel 14 in response to the detection of the corrosive compound where the pressure is adjusted such that a dew point of the corrosive compound detected is less than the temperature of the inner wall 36 of the pressure vessel 14. As a result, adverse effects of buildup and/or production of the corrosive compound may be reduced or prevented, thereby enhancing syngas production while reducing wear on the pressure vessel.

In one embodiment, method 300 includes adjusting a flow rate of the fuel 22 to the combustion chamber 12 to adjust the pressure inside the pressure vessel 14. In one embodiment, method 300 includes adjusting a flow rate of the oxidant 26 to the combustion chamber 12 to adjust the pressure inside the pressure vessel 14. In one embodiment, method 300 includes adjusting a flow rate of the diluent 30 to the combustion chamber 12 to adjust the pressure inside the pressure vessel 14.

In addition or in the alternative, method 300 includes activating the heater 32 to increase the temperature of the inner wall 36 a temperature that is above the dew point of the corrosive compound. In one embodiment method 300 includes generating corrosion signal 44 via at least one corrosion sensor 42 where the corrosion signal 44 is indicative of the presence of the corrosive compound within the gasifier 10, receiving the corrosion signal 44 at the controller 38, generating via the controller 38 at least one of the fuel signal 46 to control a flow of fuel 22 to the combustion chamber 12, an oxidant signal 48 to control a flow of oxidant 26 to the combustion chamber 12, or a diluent signal 50 to control a flow of diluent 30 to the combustion chamber 12 to adjust the pressure inside the pressure vessel 14, thus modifying the dew point of the corrosive compound. In one embodiment, method 300 includes generating a heater signal 40 via the controller 38 that is in electronic communication with the corrosion sensor 42, and communicating the heater signal 40 to the heater 32 to increase the temperature of inner wall 36 of the pressure vessel 14 to a temperature that is above the dew point of the corrosive compound.

The various embodiments as described herein and as illustrated in FIGS. 1 through 4 provide various technical benefits over exiting methods for operating a gasifier, particularly for producing synthetic gas or "syn-gas". For example, heating the inner wall 36 of the pressure vessel 14 via the heater 32 allows for real-time manipulation of the inner wall temperature regardless of external or ambient weather conditions, thus providing controllability of formation of the corrosive compounds. As a result, the production of the gasifier 10 may be enhanced while positively affecting the life of the pressure vessel 14 by reducing corrosion buildup. In addition or in the alternative, the corrosion sensor or probe 42 allows for real-time monitoring of the internal chemical conditions in the gasifier 10. As a result, adjustments to the temperature of the inner wall 36 and/or the flow of the fuel 22, oxidant 26 and/or diluent 30 may be made in real-time, thereby enhancing overall performance of the gasifier 10. In addition or in the alternative, better control over the formation of the corrosive compounds allows for operators to fine-tune or improve or enhance the chemistry of the syn-gas.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A method for operating a gasifier, comprising:
   detecting a corrosive compound between a combustion chamber defined within the gasifier and an inner wall of a pressure vessel surrounding the combustion chamber via a corrosion sensor; and
   increasing the temperature of the inner wall of the pressure vessel to a temperature greater than a dew point of the corrosive compound via a heater surrounding the pressure vessel.

2. The method as in claim 1, further comprising adjusting a flow of at least one of fuel, oxidant, or diluent to the gasifier in response to the detection of the corrosive compound inside the pressure vessel to modify the dew point of the corrosive compound.

3. The method as in claim 1, further comprising adjusting pressure inside the pressure vessel surrounding the combustion chamber so that the dew point of the corrosive compound is less than the temperature of the inner wall of the pressure vessel.

4. The method as in claim 3, further comprising adjusting a flow of fuel to the gasifier to adjust the pressure inside the pressure vessel.

5. The method as in claim 3, further comprising adjusting a flow of oxidant to the gasifier to adjust the pressure inside the pressure vessel.

6. The method as in claim 3, further comprising adjusting a flow of diluent to the gasifier to adjust the pressure inside the pressure vessel.

7. A method for operating a gasifier, comprising:
   detecting a corrosive compound between a combustion chamber defined within the gasifier and an inner wall of a pressure vessel surrounding the combustion chamber via a corrosion sensor, wherein the corrosion sensor generates a corrosion signal indicative of the presence of the corrosive compound;
   receiving the corrosion signal at a controller; and
   activating a heater that at least partially surrounds the pressure vessel via a heater command signal generated by the controller in response to the detection of the corrosive compound to increase the inner wall temperature of the pressure vessel to a temperature that is above a dew point of the corrosive compound.

8. The method as in claim 7, further comprising adjusting a flow of at least one of fuel, oxidant, or diluent to the combustion chamber in response to the detection of the corrosive compound to regulate the dew point of the corrosive compound.

9. The method as in claim 8, further comprising adjusting a pressure inside the pressure vessel so that the dew point of the corrosive compound detected in the gasifier is less than the temperature of the inner wall of the pressure vessel.

10. The method as in claim 8, further comprising generating a fuel signal via the controller to control a flow of fuel to the combustion chamber.

11. The gasifier as in claim 8, further comprising generating an oxidant signal via the controller to control a flow of oxidant to the combustion chamber.

12. The gasifier as in claim 8, further comprising generating a diluent signal via the controller to control a flow of diluent to the combustion chamber.

13. A method for operating a gasifier, comprising:
   detecting a corrosive compound between a combustion chamber defined within the gasifier and an inner wall of a pressure vessel surrounding the combustion chamber via a corrosion sensor; and
   adjusting pressure inside the pressure vessel in response to the detection of the corrosive compound, wherein the pressure is adjusted so that a dew point of the corrosive compound detected is less than the temperature of the inner wall of the pressure vessel.

14. The method as in claim 13, wherein adjusting pressure inside the pressure vessel comprises adjusting a flow rate of a fuel to the combustion chamber.

15. The method as in claim 13, wherein adjusting pressure inside the pressure vessel comprises adjusting a flow rate of an oxidant to the combustion chamber.

16. The method as in claim 13, wherein adjusting pressure inside the pressure vessel comprises adjusting a flow rate of a diluent to the combustion chamber.

17. The method as in claim 13, further comprising activating a heater that at least partially surrounds the pressure vessel to increase the inner wall temperature of the pressure vessel to a temperature that is above the dew point of the corrosive compound.

18. The method as in claim 13, further comprising:
   generating a corrosion signal via the corrosion sensor, wherein the corrosion signal is indicative of the presence of the corrosive compound within the gasifier;
   receiving the corrosion signal at a controller;
   generating via the controller at least one of a fuel signal to control a flow of fuel to the combustion chamber, an oxidant signal to control a flow of oxidant to the combustion chamber, or a diluent signal to control a flow of diluent to the combustion chamber to adjust the pressure inside the pressure vessel.

19. The method as in claim 13, further comprising generating a heater signal via a controller that is in electronic communication with the corrosion sensor and communicating the heater signal to a heater that at least partially surrounds the pressure vessel to increase the inner wall temperature of the pressure vessel to a temperature that is above the dew point of the corrosive compound.

* * * * *